United States Patent Office 3,830,743
Patented Aug. 20, 1974

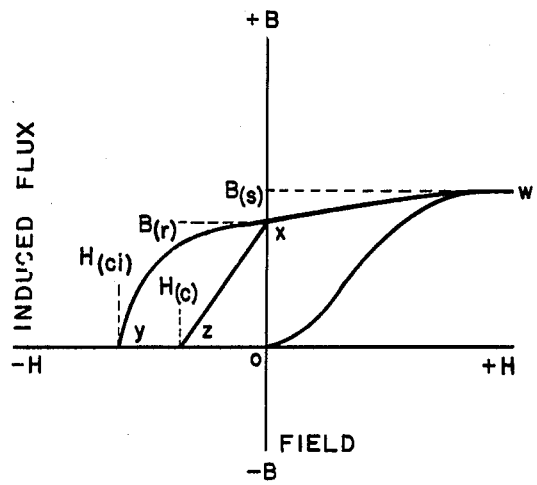
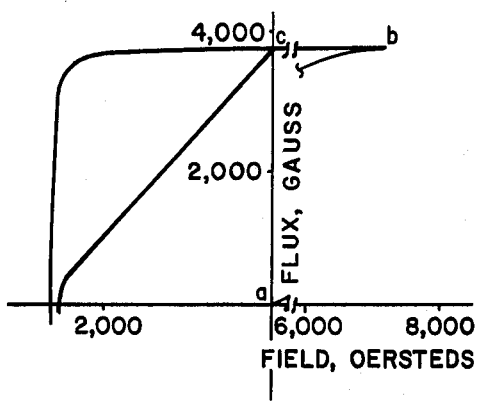
FIG. 1
FIG. 2
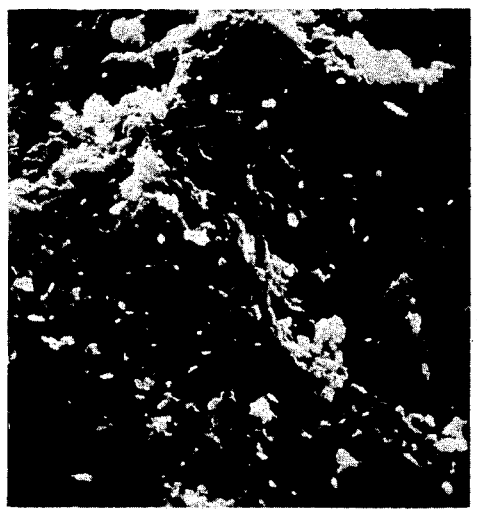
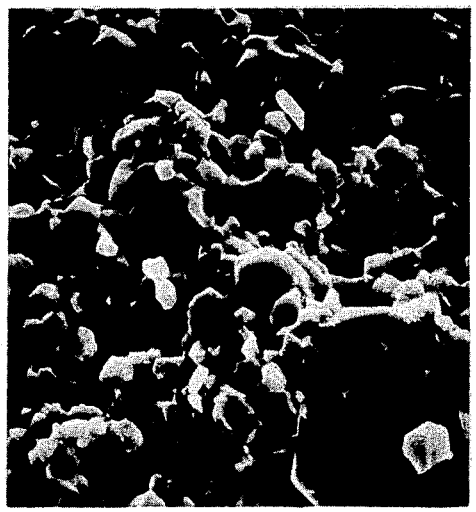
FIG. 3
FIG. 4

3,830,743
CERAMIC PERMANENT MAGNET
Charles M. Schlaudt, Berkeley, Ronald L. Clendenen, Orinda, and Eugene E. Olson, Oakland, Calif., assignors to Shell Oil Company, New York, N.Y.
Filed Sept. 27, 1971, Ser. No. 183,895
Int. Cl. H01f 1/02
U.S. Cl. 252—62.63                                4 Claims

ABSTRACT OF THE DISCLOSURE

Magnetoplumbites having the formula $PbO \cdot nFe_2O_3$, wherein $n$ is from about 3 to about 6.5, having densities of not less than 85% of the theoretical maximum, having average crystallite sizes of less than about 2.0 microns, having at least 90% of their crystallites less than 2.5 microns in diameter and crystallite orientations of not less than about 70%, yield permanent ceramic magnets having both high coercive forces and remanences.

BACKGROUND OF THE INVENTION

Field of the Invention

This invention relates to ferrite permanent magnets. More particularly it concerns lead ferrite anisotropic permanent magnets.

These novel oriented lead ferrites which yield superior ceramic permanent magnets are produced by a special four-step process described in our copending patent application Ser. No. 183,894, filed Sept. 27, 1971.

The Prior Art

Ceramic permanent magnets have a wide spectrum of application, especially in electrical devices such as loudspeakers, motors, and the like. In many applications it is desired to use a magnet having both a high remanence and a high coercive force. Such a magnet is resistant to demagnetization and is magnetically strong.

With conventional ceramic magnets it has been difficult to achieve simultaneously relatively high values for these two properties. This problem is inherent in conventional ceramic magnets and their method of production. To yield an ideal magnet of maximum remanence and coercive force a ceramic material must have four properties: (a) it must be fully ferritized, that is, there must have been full reaction between the lead and iron oxides to form a chemically bound mixed oxide ($PbO \cdot 6Fe_2O_3$) since the individual oxides are not magnetizable; (b) the mixed oxide must be in the form of small crystallites, preferably sized equal to or just above the size of a magnetic domain, i.e., 0.1 to 1.0 microns; (c) the crystallites must all be oriented, that is, lined up so that their axes of easy magnetization are all parallel; and (d) the material must be as near to the theoretical maximum density as possible. With conventional preparation methods, such as described by Haag in Annual Report March 1969-70 concerning Office of Naval Research Contract N00014-68-C-0364 or by Sixtus et al. in 27 *Journal of Applied Physics* 1051 (September, 1956), those conditions which lead to small crystallite size work against obtaining a full orientation and high density and vice versa.

It is known that metal ferrites having the chemical formula $PbO \cdot nFe_2O_3$, wherein n has a value of about 6, say from 3 to 6.5, form permanent magnets. These particular ferrite materials are also called magnetoplumbites. Table I is a listing of the magnetic properties (remanences and coercive forces) obtained with a variety of lead ferrite magnets produced heretofore for comparison with the magnets of this invention.

TABLE I
[Magnetic properties of prior art lead ferrite magnets]

| Magnet source | Remanence, gauss | Normal coercive force, oersteds | Intrinsic coercive force, oersteds |
|---|---|---|---|
| General motors' "Ferriroll" process | 3,850 | 1,940 | 1,960 |
| U.S. 2,927,898 | 1,000 | | 3,500 |
|  | 2,000 | | 2,100 |
|  | 1,800 | | 2,250 |
| 52 J. Am. Ceramic Soc. 302 | 2,620 | 1,690 | 1,850 |
|  | 1,100 | 960 | 3,020 |
| Australia 284,335 | 3,750 | 1,850 | |
|  | 3,740 | 1,600 | |
| U.S. 3,576,745 | 2,620 | 1,690 | |
|  | 2,685 | 1,730 | |

STATEMENT OF THE INVENTION

It has now been found that a lead ceramic permanent magnet having both a high coercive force and a high remanence, that is, an intrinsic coercive force of not less than 2000 oersteds and a remanence of not less than 2800 gauss, is prepared from a magnetoplumbite of the formula $PbO \cdot nFe_2O_3$, wherein $n$ has a value of from 3 to 6.5, wherein the density is not less than 85% of the theoretical maximum, the average crystallite size is not greater than 2.0 microns and a crystallite orientation is not less than 70%.

This invention will be further described below with reference to the drawing wherein FIGS. 1 and 2 are magnet hysteresis loops and FIGS. 3 and 4 are scanning electron photomicrographs, respectively, of magnets in accordance and not in accordance with this invention.

Definition of Terms

As this invention is directed to magnets with improved properties, for the sake of completeness it is desirable at this point to set out precisely what these properties are and their importance. This will be done with reference to FIG. 1 of the drawing. FIG. 1 is a graphic representation of the amount of magnetic flux induced in a permanent magnet material when it is exposed to a varying magnetizing-demagnetizing field. It is in the form of two quadrants of an intrinsic hysteresis loop. FIG. 1 also contains a portion of the normal hysteresis loop for the same material.

A sample of unmagnetized material by definition has no induced flux at O field and thus is at point O in FIG. 1. As an increasing magnetizing external field (+H) is applied, the flux induced in the sample follows in line OW and reaches a constant value referred to as the saturation magnetization ($B_s$). As the positive field is reduced, the flux follows the line WX. The flux remaining when the field has been reduced to zero is termed the remanence ($B_r$). As an increasing demagnetizing external field is applied (—H), the induced flux follows the line XY. The demagnetizing field required to decrease the induced flux to zero is referred to as the intrinsic coercive force ($H_{ci}$) of the material. Alternatively, as the demagnetizing field is increased the normal induced flux will decrease to zero along line XZ. The point at which the normal induction reaches zero is termed the normal coercive force ($H_c$).

As can thus be seen, the resistance to demagnetization which a material possesses is indicated by the intrinsic coercive force, $H_{ci}$. The strength of a magnet is given in part by the value of the remanence. The product of induction and external field as given by the normal demagnetization curve (line XZ) reaches a maximum at some B and H. The value of this product is used as a figure of merit for permanent magnet materials and is referred to as $BH_{max}$ or the energy product. It may be seen from FIG. 1 that the remanence must be equal to or less than the saturation magnetization. The intrinsic coercive force must be greater than or equal to the normal coercive force. It may also be seen that the normal coercive force cannot be larger than the remanence or else the intrinsic induction would increase even though a demagnetizing external field is being applied—a physical impossibility.

DETAILED DESCRIPTION OF THE INVENTION

Chemical Composition of the Magnets

The magnets of this invention contain ferric oxide and lead oxide. The molar ratio of ferric oxide to lead oxide preferably is between about 4.5 and 6.5. Very preferably it is between about 5.0 and 6.5 inclusive.

The magnets may contain mixtures of these divalent metal oxides, if desired, and also may contain minor amounts, for example, up to about ten percent by weight, basis the total weight, of additives such as BaO, SrO, $Al_2O_3$, $ZrO_2$, $B_2O_3$, $Bi_2O_3$, $CaF_2$, $SrSO_4$, $CaSO_4$ and the like.

Magnetic Properties of the Magnets

The most striking features of the magnets of this invention and their unusual combination of high remanences and coercive forces.

The ceramic magnets of this invention are generally characterized as having remanences of greater than 2800 gauss as well as intrinsic coercive forces of greater than 2000 oersteds, and are more particularly characterized as having remanences of from 3000 gauss to about 4000 gauss and intrinsic coercive forces greater than 2200, especially 2300 to 4500 oersteds.

Preferred magnets of this invention are further characterized as having remanences which are substantially similar to their saturation magnetizations. This feature is illustrated by FIG. 2, a graph illustrating the magnetic properties of a preferred lead ferrite in accord with this invention. As an increasing magnetic field is applied to a sample of unmagnetized lead ferrite of this invention its magnetic flux increases along line $ab$, eventually reaching a maximum (saturation) value $B_s$ at ($b$). Increasing the field further will not increase the flux beyond $B_s$. As the field is reduced to zero, the flux follows line $bc$ and reaches its remanence value $B_r$. As the figure illustrates, the remanence has essentially the same value as the saturation magnetization.

The ratio of remanence to saturation magnetization is one measure of a magnet's extent of crystallite orientation since crystallographic orientation is related to magnetic orientation. An ideal single crystallite has a remanence along its axis of easy magnetization equivalent to its saturation magnetization. A plurality of crystallites, if perfectly oriented, would exhibit a $$\frac{B_r}{B_s} = 1.0$$

as well. Thus, the extent of crystallite orientation can be determined by the ratio $B_r/B_s$.

The high strength magnets of this invention find application in a variety of areas, for example in electric motors, in loudspeakers, and in holding applications.

Physical Properties of the Magnets

The magnets of this invention are dense and finely grained, and have a high degree of crystallite orientation. The densities of these ceramic magnets are at least 70% preferably at least 80% and most preferably at least 85% of the theoretical maximum. The average grain size of these magnets is less than 2.0 microns, preferably in the range of from 0.5 to 2.0 microns and most preferably from 0.6 to 1.5 microns. Not only are the grains of these magnets small in size, they are also uniform in size. Suitably at least about 90% of the grains have diameters of less than 2.5 microns and preferably at least about 90% have diameters of less than 2.0 microns.

The unique crystal structure of the magnets of this invention is clearly shown by a scanning electronmicroscope. FIGS. 3 and 4 are equivalent scanning electron photomicrographs respectively of a magnet of this invention and an excellent quality conventional ferrite magnet (sold under the trade name Steward 504) showing the uniform fine grain size of the present magnets and the irregular grain size of conventional materials. The grains of the magnets of this invention are preferably highly oriented. Preferably, at least 70% of the crystallites are oriented, with orientations (as shown by the ratio of remanence over saturation magnetization) of not less than 80% being most preferred.

Preparation of the Magnets

Ferrite ceramic permanent magnets in accord with this invention are prepared by a hot forging process when this process is carried out under certain controlled conditions. This process comprises the steps of:

(a) Preparing solid particles comprising an intimate agglomerate of suitable proportions of less than 0.1 micron grains of ferric oxide and lead oxide;

(b) Heating these particles for up to 24 hours at a temperature in the range of from 700° C. to 1000° C. to effect at least a partial chemical reaction between the iron and lead oxides (ferritization) and produce less than 0.5 micron ferrite crystallites;

(c) Heating the at least partially ferritized particles for up to 2 hours at 750° C. to 1000° C. (preferably while applying up to 30,000 p.s.i. pressure) to effect at least a partial sintering together of the particles into a solid body;

(d) Heating at 700° C. to 1050° C. and pressing at up to 30,000 p.s.i. (hot forging) the resulting sintered body to densify it to at least 95% of theoretical maximum, to completely ferritize it, and to deform it and thus align its magnetic crystallites; and (e) Magnetizing the resulting ferrite compact by conventional means to give a permanent magnet.

In the first step of this process small solid particles are prepared which consist essentially of ferric oxide, and lead oxide, and any desired additives. These components should be present in the same proportions as desired in the finished magnets.

The particles formed in this step are themselves agglomerates of particles of the iron oxide and lead oxide. With any of these compositions, it is very desirable that these agglomerates be small and is essential that the particles which make up the agglomerates be very small in size. The agglomerates must be made up of particles of ferric oxide and lead oxide which are less than 0.1 microns in diameter. Preferably the individual oxide particles which make up the agglomerates are less than 0.02 micron in diameter.

Suitable agglomerated particles are produced by several techniques. In one method, for example, they are prepared by coprecipitating a mixture of decomposable compounds of the metals and then thermally decomposing the precipitate. Other techniques include, for example, spray drying or spray roasting a mixed salt solution. These methods all lead to very intimately mixed agglomerates of less than 0.1 micron particles of ferric oxide and lead oxide.

Using the coprecipitation technique, a solution of correct molar ratio, most conveniently in water, of soluble ferric and lead and optionally additive salts is first prepared. Examples of suitable salts include ferric nitrate, acetate, chlorate, formate, and oxalate; and lead nitrate, nitrite, citrate, and acetate.

The solution of salts is then treated with a precipitating agent which gives a thermally decomposable precipitate. Examples of suitable precipitating agents are hydroxyl ion, carbonate ion, and the like. Preferred precipitating agents are hydroxide ion and carbonate ion in amount of from about one to about ten times the stoichiometric amount required for precipitation of all the metal ions present.

The mixed precipitate is separated and thermally decomposed in an oxygen-containing atmosphere to give the agglomerated particles of the oxides. Generally, an exposure of from about 2 to 36 hours at temperatures in the range of from about 400° C. to about 700° C. is adequate to carry out the decomposition. Longer times and higher temperatures may be required with very difficult to decompose salts.

Using the spray drying technique, first a solution is prepared containing a decomposable ferric salt and a decomposable salt of lead in the desired 3:1 to 6.5:1 molar ratio. Suitable salts include nitrates, carbonates, acetates, chlorides and like materials which decompose when heated in the presence of oxygen. Any additives should also be present in this solution to ensure their ultimate intimate admixture with the principal metal oxides. The solution is atomized into a chamber maintained at an inlet drying temperature in the range of from about 100° C. to about 600° C., preferably from 200° C. to 500° C., to form small, dry particles of mixed decomposable salt. These particles are then thermally decomposed in an oxygen-containing atmosphere. This decomposition step is similar to that described with the coprecipitation method of forming particles and requires similar conditions.

Using the spray roasting technique, a solution of decomposable salts is prepared and atomized into a chamber or fluidized bed having an oxygen-containing atmosphere heated to a temperature in the range of from 500° C. to 1000° C. In one step the particles of mixed decomposable salts are formed and thermally decomposed to mixed oxides.

Each of these techniques gives fine agglomerates having internal particles of ferric and lead oxides which have diameters of not greater than about 0.1 microns.

The particulate solids produced in the first step are agglomerates of essentially distinct grains of ferric oxide and grains of lead oxide. In this step of the process, these agglomerates are heated to a temperature of 700° C. to 1000° C. for up to 24 hours to cause these separate oxide grains to chemically react and form small crystallites of lead ferrite. This heating step is known as ferritizing. It is essential that the temperature and period of this heating be closely controlled. The temperature must be maintained high enough to cause the metal oxides to react with one another but must not be substantially above the reaction temperature or else undesired particle grain growth will occur. It is not necessary that this ferritization be carried to completion. It is preferred to obtain full ferritization partially by heating in this step and partially by heating with pressure in the next two production steps (forming and forging). When pressure is applied with heat in the forming and forging steps which follow, full ferritization is achieved at lower temperatures and thus with far less chance of undesired grain growth. Temperatures selected in the range of from 750° C. to 900° C. are preferred for full or partial ferritization as are heating periods of from 0.5 to 8 hours, it being understood that the higher temperatures require shorter times while lower temperatures require longer times.

Examples of suitable ferritizing conditions are: about 24 hours at 600° C., about 4 hours at 800° C., and about 0.5 hour at 900° C.

The metal ferrite powder next is formed into a compact solid mass either by the application of heat (sintering) or preferably by the application of heat and pressure. This step is required since an essentially solid body must be employed in the hot forging step which follows to prepare the actual magnetizable ceramic material.

In this sintering step the emphasis is on the relatively quick heating which permits sintering while minimizing grain growth. Generally, heatings of up to about 2 hours at 750° C. to 1000° C. give a good sintered product, more specifically, 0.1 to 2.0 hours at 800° C. to 900° C. are preferred. Examples of suitable sintering conditions are about 1.5 hours at 800° C. and about 0.5 hour at 900° C.

In a preferred method of operation, heat and pressure are both employed to effect compaction and sintering. The use of pressure permits lower temperatures and/or shorter times to be employed and thus further limits grain growth. Very suitable hot pressing conditions are in the range of from 700° C. to 1000° C. and preferably 800° C. to 950° C. and from 1000 to 30,000 p.s.i. Use of conditions in this range, enable suitable compaction to be effected in a total heating cycle of about 15 minutes or less, preferably from 1.0 to 10 minutes. Typical pressure sintering conditions are:

10 minutes at 850° C. and 15,000 p.s.i.,
10 minutes at 950° C. and 5,000 p.s.i.,
3 minutes at 950° C. and 20,000 p.s.i., and
1 minute at 1000° C. and 10,000 p.s.i.

The sintering or hot pressing may be carried out in an oxygen containing environment (air) in an inert environment (nitrogen) or in a vacuum.

The nature of the product of the sintering (or preferably hot pressing) is critical to the success of this process. To ultimately yield the desired high quality magnets, it is essential that the product of this step be made up of uniform, less than 1 micron diameter crystallites. When heat and pressure are applied in this step the products are more particularly characterized as being solids, having densities of from 80 to 100% of the theoretical maximum. When heat alone is applied the products are solids of lower density, generally 40 to 80% of the theoretical maximum. These materials must have this lower density because more severe heatings necessary to achieve higher densities also give undesired amounts of grain growth. In this case, full density in addition to crystallite orientation is achieved in the following hot forging step. In both cases the solid products are made up of crystallites having an average diameter preferably less than 0.7 micron, especially from 0.3 to 0.7 micron, and having not more than 10% of their diameters greater than 1 micron. When such a product is oriented and if necessary densified in the hot forging step, a superior magnet results. Without further treatment, this product might be useful in low quality crude magnet applications, but might not be suitable as a desirable high quality magnet.

The fine grain solid ferrite body formed in the sintering step has the property of being ductile when heated to a temperature approximating its forming temperature. This property is utilized in the hot forging step to effect the full densification and orientation of ferrite grains essential to the production of an anisotropic permanent magnet. The hot forging is carried out by heating the ferrite body and applying a pressure to it in a manner which deforms it. As in the sintering step, the emphasis is on a rapid treatment with a limited exposure to high temperatures to minimize grain growth. Conditions similar to the hot pressing conditions optionally used to form the solid ferrite body may be used for hot forging. Temperatures of from 700° C. to 1050° C., preferably 750° C. to 1000° C. and pressures of from 1000 to 20,000 p.s.i., preferably 3000 to 20,000 p.s.i., and times of up to about 0.5 hour, preferably up to about 0.2 hour are useful, with times of from 0.1 to 5 minutes being preferred.

The temperature and pressure are most favorably controlled to give a strain rate of from about 1%/min. to about 500%/min. The preferred temperature and pressure conditions noted above fall into this area.

The amount of forging, that is, the amount of deformation, should be controlled. A measure of the deformation is expressed by the ratio $$L-L_0/L_0$$

wherein L is the size of the body along the forging axis after forging, and $L_0$ is the size before forging. To achieve the same degree at orientation, non-dense bodies will require different degrees of forging than dense bodies for, in the former, a certain amount of forging will be taken up in the densification process. After the material has been forged to essentially theoretical density, additional forging will produce bulk flow of the material resulting in orientation. The deformation of a body by forging can be approximated by the equation $$\frac{L-L_0}{L_0}=(\rho_r-1)+\frac{L-\rho_r L_0}{\rho_r L_0}$$

wherein $\rho_r$ is the density relative to theoretical. The first term in parentheses represents the contribution of densification to forging, and the second term represents the contribution of mass flow. For any given density, the most suitable values for forging, represented by $$L-\rho_r L_0/\rho_r L_0$$

will range from 0.1 to 0.9 with values between 0.2 and 0.75 being preferred.

This deformation orients the crystal structure of the ferrite such that the axes of easy magnetization are aligned. When this aligned structure ferrite is magnetized in a field maintaining the same orientation as the alignment, a strong permanent magnet is formed.

The magnets of this invention will be further described by the following examples and comparative experiments. These are presented for purposes of illustration and are not intended to limit the scope of this invention.

EXAMPLE I

Preparation of PbO·5.8 $Fe_2O_3$ magnet

A. Starting Material Preparation: 7001 grams of $Fe(NO_3)_3 \cdot 9H_2O$ and 498.75 grams at $Pb(NO_3)_2$ were dissolved in 13 gallons of water. This solution was dried in a Niro Portable Spray Drier. The inlet temperature was 430° C. and outlet temperature was 160° C. The material from the spray drier was placed in ceramic crucibles and heated to 600° C. for 15½ hours to remove the nitrates.

B. Ferritization: To ferritize the material, the crucibles containing the powder were placed in a furnace at 800° C. for 4 hours in air. The calcined material was ground/crushed to pass an 80 mesh sieve. This material consisted of less than 0.5 micron particles of lead ferrite.

C. Hot Pressing: The ferrite powder was loaded into a graphite die and then heated to 900° C. in a graphite heating element furnace. Applied pressure was about 4000 p.s.i. The furnace atmosphere pressure ranged from 35 to about 350 microns during the hot pressing operation. The sample was held at temperature for about 15 minutes to effect sintering. The sample was cooled in the furnace, removed, and cored into smaller specimens which were later to be hot forged. Property measurements on the hot pressed sample gave the following results:

Density=5.38 gm./cc.
$B_s$=3220 gauss
$B_r$=2640 gauss
$H_c$=2230 oersteds
$H_{ci}$=3510 oersteds
$BH_{max}$=1.5×10⁶ gauss·oersteds The material was a solid having an average grain size of about 0.2 microns.

D. Hot Forging: Samples cored from the hot pressed material were forged to different degrees. Strain rates on all of the forgings were kept constant at 10%/min. The forging temperature was 1000° C. The forging atmosphere was air. The samples were placed in a cold furnace, the furnace then being heated to the forging temperature in 9 minutes. The samples were allowed to equilibrate for 15 minutes at temperature, then sufficient load was applied to deform the specimens at the required rate. The samples were cooled in air and removed from the furnace. Their properties were as follows:

| | | | |
|---|---|---|---|
| $\frac{L-L_0}{L_0}$, percent | 50.5 | 61.4 | 71.6 |
| Density, g./cc. | 5.41 | 5.42 | 5.44 |
| $B_s$, gauss | 3,800 | 3,900 | 3,850 |
| $B_r$, gauss | 3,750 | 3,900 | 3,830 |
| $H_c$, oersteds | 2,700 | 2,650 | 2,580 |
| $H_{ci}$, oersteds | 2,800 | 2,700 | 2,620 |
| $BH_{max}$, gauss-oersteds | 3.4×10⁶ | 3.7×10⁶ | 3.6×10⁶ |
| Grain size, microns | ¾ | 1 | 1 |
| Less than 10% larger than, microns | 1 | 1¼ | 1¼ |

Theoretical maximum density 5.57 grams/cc.

EXAMPLE II

Preparation of PbO·6$Fe_2O_3$ by coprecipitation

A. Starting Material Preparation: 87.9 grams of $Pb(NO_3)_2$ (which included 3.8 grams excess to compensate for the solubility at $Pb(OH)_2$ in the water of mixing and washing) and 1231.3 grams of $Fe(NO_3)_3 \cdot 9H_2O$ were dissolved in 4 liters of distilled water. This solution was precipitated to pH 9 with concentrated $NH_4OH$ solution. The solution was allowed to stand overnight and the precipitate was filtered and washed with 24 liters of distilled water. The filter cake was dried at 50° C. overnight and ground to 80 mesh.

B. Ferritization: The precipitated material, after reaction at 800° C. for 4 hours, was examined and found to be comparable to spray dried material, both chemically and physically.

EXAMPLE III

Using the general operating procedures of Example I, but varying the conditions within the preferred ranges of this invention, a variety of magnets were prepared. These magnets had the following properties:

| Magnet | $\frac{[Fe_2O_3]}{[PbO]}$ | Remanence, gauss | Intrinsic coercive force, oersteds |
|---|---|---|---|
| A | 5.8 | 3,800 | 2,700 |
| B | 5.8 | 3,900 | 2,900 |
| C | 5.8 | 3,800 | 2,200 |
| D | 5.8 | 3,600 | 2,700 |
| E | 6.0 plus 2.5% wt. $Al_2O_3$ | 3,200 | 4,300 |

ILLUSTRATIVE EMBODIMENTS

Lead Ferrite Production $Fe(NO_3)_3 \cdot 9H_2O$ and $Pb(NO_3)_2$ in the molar ratio of 12 to 1 are dissolved in water. This solution is atomized and passed through a tube heated to about 800° C. It has a residence time in the tube of about 2–3 minutes. The product of this spray roasting treatment is a fine powder of mixed oxide. The powder particles are agglomerates of less than 0.02 micron grains of oxides. The powder is maintained at about 800° C. for about 4 hours to permit the two metal oxides to react (ferritize). This powder is placed in a die and hot pressed at 10,000 p.s.i. and 800° C. for 5 minutes to give a solid compact having a density of about 80% of theoretical maximum. This body would have grain structure wherein at least 90% of the crystals have diameters of from 0.05 to 1 microns. This body of material is placed between two platens and hot forged at 25,000 p.s.i. and 850° C. until a $$L-L_0/L_0$$

of about 0.6 is achieved. This product would be a highly oriented ferrite, suitable for preparing excellent magnets.

Ferrite Production Using Sintering Instead of Hot Pressing

An experiment similar to Example I is carried out. Steps A and B are repeated. The ferrite powder of step B is formed into a pellet and maintained at 900° C. for 0.5 hour to effect sintering. The resulting product would have a density about 60% of the theoretical maximum. It would have a crystal size distribution similar to that observed in Example I. When hot forged in accord with Example I it would yield dense oriented products, similar to those obtained in Example I.

Comparative Experiments

A series of comparative experiments were conducted to demonstrate certain critical features of the present invention.

A. Orientation Using a Cold Orienting Process: A sample of the PbO·5.8 Fe$_2$O$_3$ powder prepared in accord with Example III was cold oriented in a conventional manner using a 4000 oersted magnetic field. This product was sintered with pressure and its magnetic properties were measured. It had a remanence of 3100 gauss and an intrinsic coercive force of 2100 oersteds.

B. Use of Too Severe Ferritizing Conditions: A series of samples were prepared in accord with Example I, the temperatures, times and pressures employed were varied. The following ferritizing conditions were found to give poor final products.

A sample of PbO·Fe$_2$O$_3$ was ferritized for 32 hours at 800° C. After hot pressing at 950° C. and 5000 p.s.i. in accord with Example I, the sample had a low intrinsic coercive force (1100 oersteds) showing excessive grain growth.

C. Use of Too Severe Hot Forging Conditions: A PbO·6Fe$_2$O$_3$ sample was prepared in accordance with Example 1. The hot forging conditions were varied. The following conditions were found to be too severe. When the sample was forged at 900° C. and 4000 p.s.i. until a 93% deformation $$(L-L_0/L_0)$$

was achieved, the resulting product showed inferior properties. It had a remanence of 3460 gauss and normal and intrinsic coercive forces of 1580 oersteds each.

We claim as our invention:

1. A permanent ceramic magnet having an intrinsic coercive force of not less than 2000 oersteds and a remanence of not less than 2800 gauss and consisting of a magnetoplumbite of the formula PbO·$n$Fe$_2$O$_3$ wherein $n$ has a value of from 3 to 6.5; and having a density of not less than 85% of the theoretical maximum, an average grain size of less than 2.0 microns, not less than 90% of its grains less than 2.5 microns in diameter and a crystallite orientation of not less than 70%.

2. The magnet in accordance with claim 1 wherein the coercive force is not less than 2200 oersteds and the remanence is in the range of from 3000 gauss to about 4000 gauss.

3. The magnet in accordance with claim 2 wherein $n$ has a value of from 4.5 to 6.5.

4. The magnet in accordance with claim 3 wherein the density is not less than 85% of the theoretical maximum, the average grain size is from 0.6 to 1.5 microns and at least 90% of its grains are of diameters of less than 2.0 microns.

References Cited

UNITED STATES PATENTS

| | | | |
|---|---|---|---|
| 3,189,550 | 6/1965 | Malinofsky | 252—62.62 |
| 3,337,461 | 8/1967 | Cochardt | 252—62.63 |
| 3,576,745 | 4/1971 | Tokar, Jr. | 252—62.63 |

EDWARD J. MEROS, Primary Examiner

J. COOPER, Assistant Examiner

U.S. Cl. X.R.

423—594